United States Patent
Deshpande et al.

(10) Patent No.: US 10,163,127 B2
(45) Date of Patent: Dec. 25, 2018

(54) SPATIOTEMPORAL MARKETING ASSOCIATED WITH EVENTS BASED ON INTENDED USER INGRESS AND EGRESS MODES AND PATHS

(71) Applicant: INTERNATIONAL BUSINESS MACHINES CORPORATION, Armonk, NY (US)

(72) Inventors: Ajay A Deshpande, White Plains, NY (US); Kimberly D Hendrix, New Albany, OH (US); Herbert S McFaddin, Yorktown Heights, NY (US); Chandrasekhar Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1034 days.

(21) Appl. No.: 14/529,865

(22) Filed: Oct. 31, 2014

(65) Prior Publication Data
US 2015/0120407 A1    Apr. 30, 2015

Related U.S. Application Data

(60) Provisional application No. 61/897,870, filed on Oct. 31, 2013.

(51) Int. Cl.
*G06Q 30/02* (2012.01)

(52) U.S. Cl.
CPC ..... *G06Q 30/0252* (2013.01); *G06Q 30/0257* (2013.01); *G06Q 30/0261* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 7,930,204 B1 * | 4/2011 | Sharma | G06Q 30/0203 705/7.32 |
| 2005/0076003 A1 | 4/2005 | DuBose et al. | |
| 2006/0286989 A1 * | 12/2006 | Illion | G06Q 10/109 455/456.3 |
| 2008/0215426 A1 * | 9/2008 | Guldimann | G06Q 30/02 705/14.61 |
| 2009/0248537 A1 * | 10/2009 | Sarkeshik | G06Q 30/02 705/26.1 |
| 2010/0027527 A1 * | 2/2010 | Higgins | H04W 4/18 370/351 |
| 2010/0088179 A1 * | 4/2010 | Desai | G01C 21/3407 705/14.49 |
| 2013/0041737 A1 | 2/2013 | Mishra et al. | |

OTHER PUBLICATIONS

Office Action dated Oct. 5, 2017 in related U.S. Appl. No. 14/747,735.

* cited by examiner

*Primary Examiner* — Vincent M Cao
(74) *Attorney, Agent, or Firm* — F. Chau & Associates, LLC

(57) ABSTRACT

A method to perform spatiotemporal events marketing includes: presenting, by a server, an interface on a display of a customer device, wherein the interface comprises a selectable list of times in which an event is to occur, determining, by the server, a route to the event or from the event, by a user of the customer device; and presenting, by the server, a selectable list of offers in the interface, wherein the list of offers is based on the selected time, a location of the event, and the route.

17 Claims, 6 Drawing Sheets

SPATIOTEMPORAL MARKETING ASSOCIATED WITH EVENTS BASED ON INTENDED USER INGRESS AND EGRESS MODES AND PATHS

CROSS-REFERENCE TO RELATED APPLICATIONS

This application claims priority to U.S. Provisional Application No. 61/897,870 filed on Oct. 31, 2013, the disclosure of which is incorporated by reference herein.

BACKGROUND

1. Technical Field

The present disclosure relates to marketing of events, and more particularly to marketing of events using spatiotemporal event information.

2. Discussion of Related Art

Users interested in attending various events can use a computer to navigate to one or more internet or world wide web (WEB) sites that list these events. Then the user can select one of the listed events to bring up a WEB page listing the date/time of the event, a map of an area surrounding the event, and options for purchasing tickets to the event. User interactions with such sites can provide rich information to marketers about the user's intentions with regard to attendance of such events, and in particular provide data about the user's future time and location. However, such user interfaces and sites currently lack a systematic way of exploiting this information for marketing purposes, in particular the presentation of additional targeted offers to the user.

BRIEF SUMMARY

According to an exemplary embodiment of the invention, a method of performing marketing associated with spatiotemporal events includes: presenting, by a server, an interface on a display of a customer device, wherein the interface comprises a selectable list of times in which an event is to occur; determining, by the server, a route to the event or from the event, and mode of travel, by a user of the customer device; and presenting, by the server, a selectable list of offers in the interface, wherein the list of offers is based on the selected time, a location of the event, and the ingress and/or egress routes and modes to and from the event. An event can include any form of user engagement such as a entertainment event, sporting event, community event, shopping trip, a professional or personal appointment. An offer can include information about associated services pertaining to the users activity and location, including potentially other events of the same or different nature in relation to the original event. The reader will understand that the characterizations of the terms "event" and "offer" does not restrict their definitions to the examples given herein.

According to an exemplary embodiment of the invention, a computer system configured to provide marketing associated with spatiotemporal events includes a memory storing a computer program, a database, and a processor. The database maintains a list of events including event time and location and a list of affiliated merchants and offers the merchants wish to extend to attendees of the listed events. The processor is configured to execute the computer program. The computer program is configured to determine which one of the listed events a customer of a customer device remote from the computer system has an interest in attending and output the offers of the affiliated merchants for the one listed event to the customer device.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Embodiments of the present invention relate to methods and/or systems that can use spatiotemporal knowledge associated with an event (e.g., location/place of the event, time/date of the event) that a user has an interest in attending, along with additional information, and user feedback to determine related offers to present to the same user.

In an exemplary embodiment of the invention, the offers are presented after a user expresses an intent to attend an event (e.g., by purchasing a ticket). The spatiotemporal information about the event and the spatiotemporal information about the user's (customer) likely trajectory to enter and exit (ingress and egress) from the event is used to provide targeted offers from other merchants. The offers may be further refined based on the location, time, nature of the event and the customer's likely trajectory, profile, etc.

Figure 1:
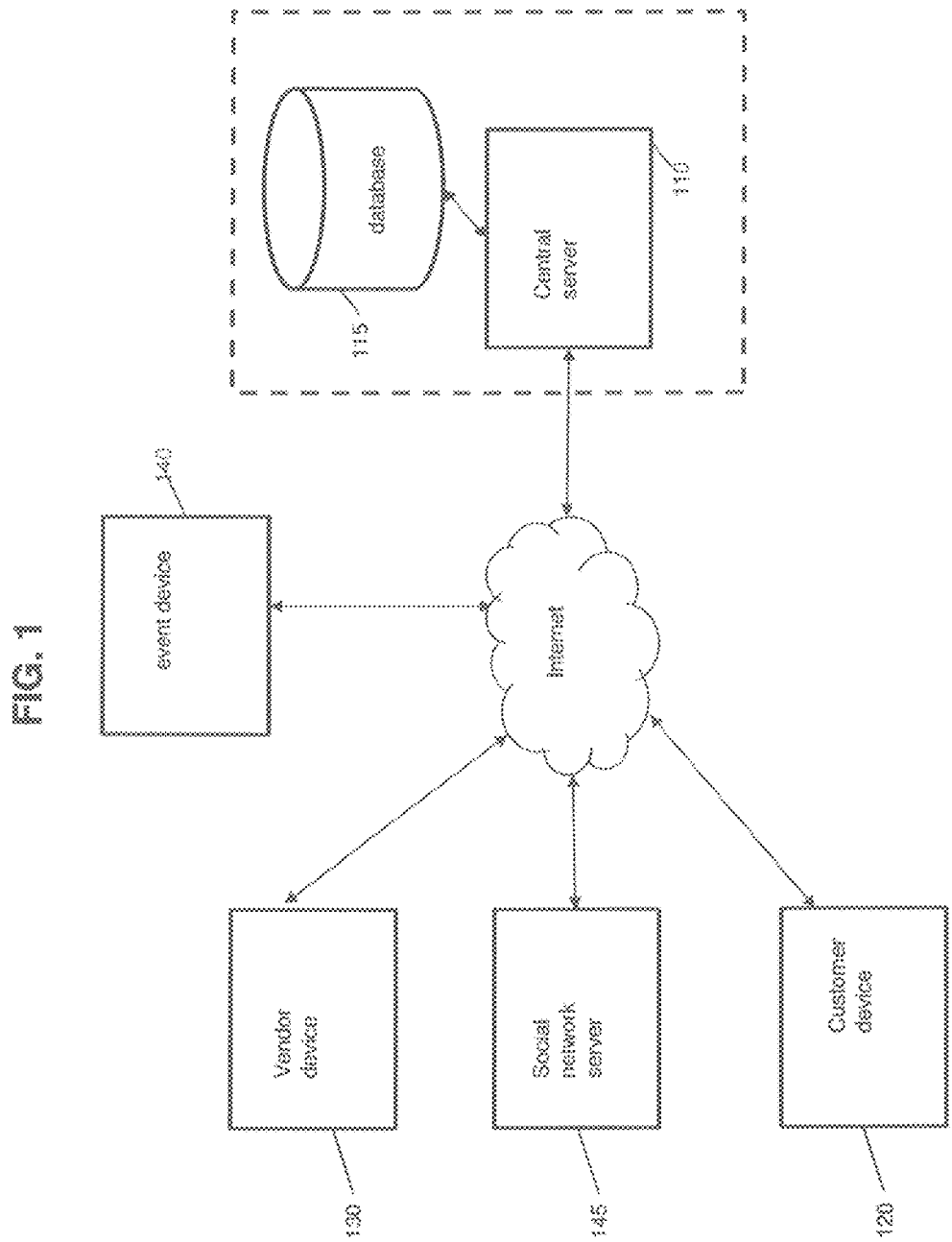
FIG. 1 illustrates a system for performing spatiotemporal events marketing according to an exemplary embodiment of the invention.

FIG. 1 illustrates the system according to an exemplary embodiment of the invention. Referring to FIG. 1, the system includes a central server 110 and a database 115. The central server 110 may be configured to maintain a website that is accessible to the customer device 120, the vendor device 130, and the event device 140 through the Internet. Examples of the device 120, 130, and 140 include but are not limited to a smartphone, a tablet computer, and a desktop computer.

The website can be used by the central server 110 to present events and offers to a customer using the customer device 120. The website can be configured to enable a vendor using the vendor device 130 to enter one or more offers for storage on the database 115. The website can be configured to enable an individual managing an event using the event device 140 to enter one or more events for storage on the database 115. For example, an individual managing an event can enter into the database 115, the title of the event, the type of the event (e.g., sports, arts, food, wine, beer, comic, etc.), the location of the event, the time of the event, the date of the event, the price of tickets to the event, the number of tickets available, etc.

The central server 110 can also retrieve social network data from the social network server 145 to gain insight about vendors providing the offers. For example, the central server 110 can access the social network server 145 to determine how frequently people check-in to a particular location near a vendor, to determine how the vendor ranks relative to other vendors, etc.

The central server 110 can determine whether a customer is interested in a particular event in various ways. In an embodiment, the customer device 120 runs an application that has access to search terms entered by the customer or the customer's browsing history, and the application periodically reports this information to the central server 110. For example, if the customer enters the term "Knicks Tickets", the central server 110 can infer that the customer has a specific interest in attending a Knicks game, or at least has a general interest in attending a basketball game.

In another embodiment, server 110 determines whether the customer is interested in attending an event by how the customer interacts with its website. The website can present to the customer a list of different events. For example, if the customer selects one of the listed events, the server 110 can infer that the customer has an interest in attending the event. The website may also provide a search field that enables the customer to enter one or more terms. For example, if the customer enters the term "Giants tickets" into the search field, the server 110 can infer that the customer has an interest in attending a Giants game, or at least has a general interest in attending a football game.

The website may be configured to enable the customer to register for one of the provided events or purchase tickets to one of the events. In an exemplary embodiment, the server 110 determines that the customer has an interest in an event after the customer has either registered to the event or purchased a ticket to the event from the website. The web site may require the user to register and create a login id and access the site after the user authenticates to it.

The central server 110 can maintain a different vendor account for each vendor. A vendor using a vendor device 130 can logon to their account and enter information about offers they want to provide. The offer may indicate the service or product provided, the cost of the service or product, a discount level to the service or product provided (e.g., 10% off), a date and time or period (e.g., every Sunday) when the offer is available, terms of the offer (e.g., much purchase at least $50.00, etc), the location of the vendor, etc. The information about the offer may indicate whether the offer is tied to a particular event. For example, certain merchants will offer a discount to a customer who has a ticket to a particular event. The offers are stored by the server 110 in the database 115 (e.g., a relational database).

Once the server 110 has determined what event the customer is interested in, the server 110 determines a subset of the available offers to present to the user. The server 110 can determine this subset using information inferred from actions performed by the customer on the website. For example, the server 110 can determine this subset based on what data the customer enters into data fields on the website, by what offers a customer selects from the website, and from other data that can be inferred from the entered data and the selected offers. For example, the server 110 can infer an ingress path of the customer from a starting location to the event or an egress path of the customer from the event back to the starting location or an ending location, where offers along or near these paths are part of the subset.

Figure 2:
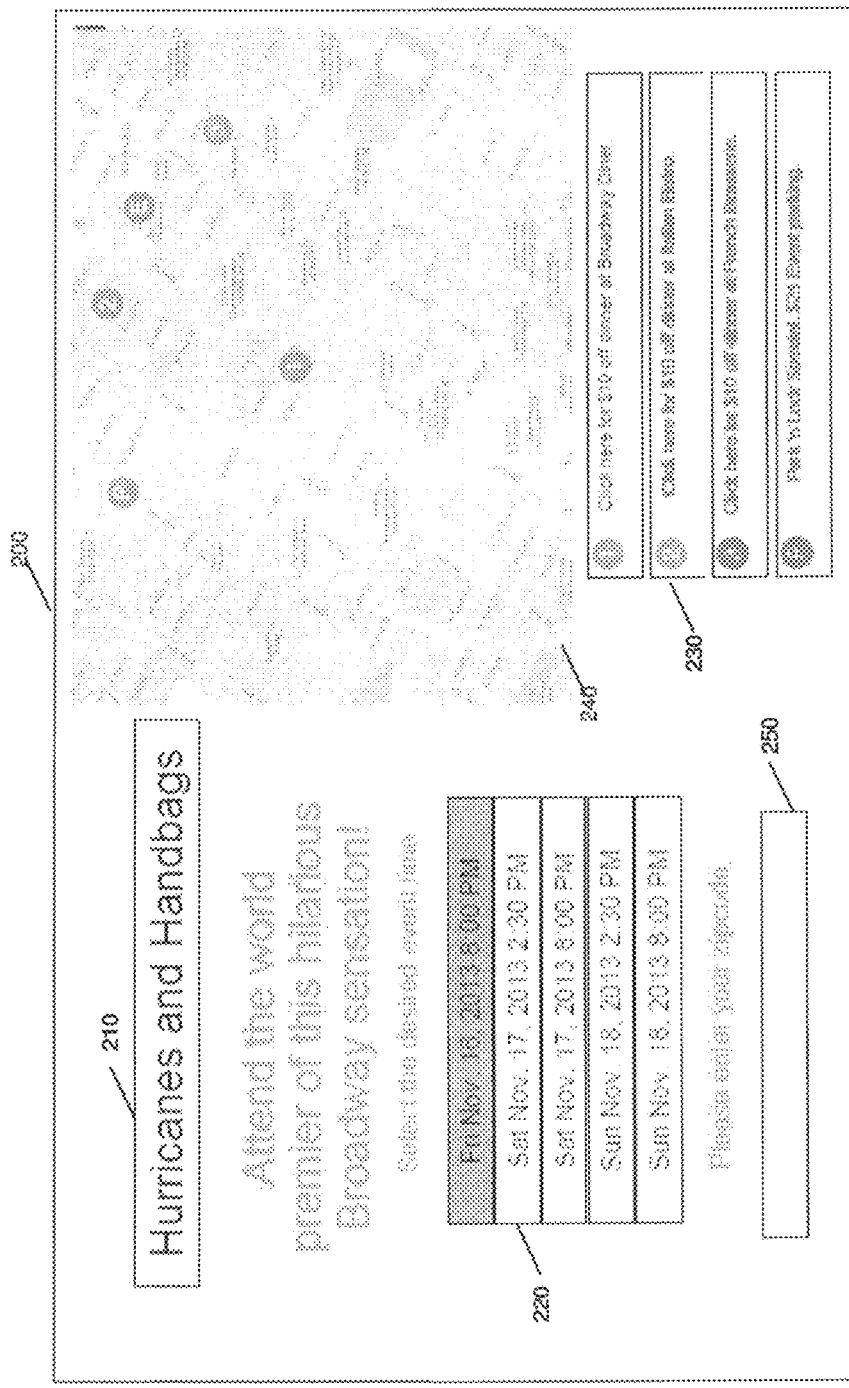
FIG. 2 illustrates an interface that may be presented by the system.

FIG. 2 shows an example of a webpage 200 that may be presented by the server 110, which can be viewed on a display of the customer device 120 using browser software of the customer device 120. For example, it is assumed that the customer has used their browser to navigate to the website of the server 110, entered information to the website indicating an interest in a particular event, and the webpage 200 has been initialized with information about the event.

The webpage 200 displays a title 210 of the event, a selectable list of times/dates 220 listing the times/dates of the event, an information field 250 (e.g., an input element), a map 240, and a selectable list of offers 230.

Although not shown in FIG. 2, the webpage 200 may also present options that enable the customer to purchase one or more tickets to the event for the selected time/date or register for the event, and provide other information about the event, such as the address of the event, activities associated with the event, and prices of the tickets.

While the information field 250 is illustrated as a zipcode entry field, the information field 250 is not limited thereto. For example, the information field 250 may request other information about the customer such as their street address, their city, their county, and their state.

The list of offers 230 is based on at least one of the time and date of the selected event and the location of the selected event. For example, if the event is close in time to a dinner period (e.g., 5-9 pm), the list of offers 230 could include offers for dinner from restaurants within a certain radius of the selected event. The offers are not limited to restaurants, but can come from merchants of any type, such as a bar, a sports center (e.g., pool, tennis, golf, bowling, an arcade), or a parking garage. In an embodiment, the list of offers 230 is derived only from a list of those merchants that have paid to be associated with the event. Other offers may include baby sitting services, transportation services (e.g., UBER like transport services), dry cleaning services, car wash and clean services—e.g., clean your car while you are enjoying a show.

The offers in the list of offers 230 may be chosen based on attributes associated with the event. For example, if the event is a Broadway show, and it is known (e.g., from statistics, surveys, a subject matter expert, etc.) that people who attend Broadway shows prefer high end restaurants, an attribute could be associated with the event that indicates only offers from restaurants above a certain pricing category are to be presented.

The map 240 illustrates a map of the area surrounding the event. The selected event may be marked with a unique symbol (e.g., an 'E', a red circle) in the map 240. The map 240 may be marked with unique symbols (e.g., numerals, blue circles) representing the locations of all the offers in the list of offers 230.

Figure 3:
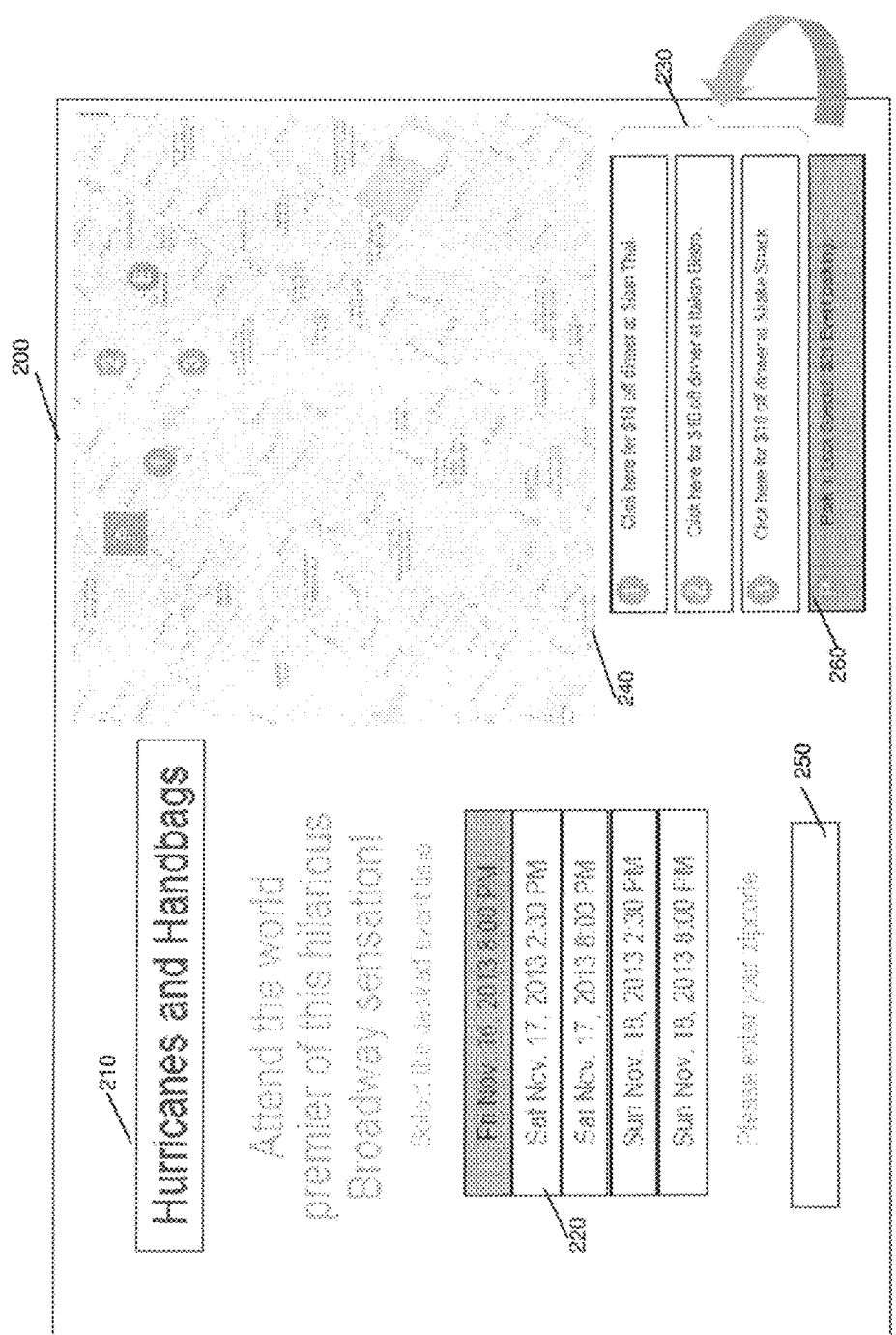
FIG. 3 illustrates an interface that may be presented by the system.

FIG. 3 shows a further example of the webpage 200. In this example, the server 110 has updated (changed) the list of offers 230 using information learned from a customer selecting one of the previously listed offers. For example, as shown in FIG. 3, the customer has selected an offer to park from a parking garage located near the event. Based on the location of the parking garage, the location of the event, and map data surrounding the event, the server 110 can predict the most likely routes the customer will take from the parking garage to the event and from the event back to the parking garage. The server 110 then updates the list of offers 230 to list only offers from those merchants on the determined routes, and updates the map 240 to identify the locations of these new offers. In an embodiment, the server 110 adjusts the symbol of the selected offer in the map 140 so it can be distinguished from the unselected offers. For example, the selected offers can be marked on the map 140 as a red square, while the unselected offers can be marked on the map 140 as blue circles. In an exemplary embodiment, selection of an offer (e.g., the parking garage offer) in the list of offers presented in FIG. 2 causes the selected offer to be moved into a list of selected offers 260 that is separate from the list of offers 150.

In this example, since the customer has selected a parking garage offer, attributes associated with individuals that drive automobiles can be associated with the customer. This association can have an effect on what offers are displayed in the list offers 230. For example, due to this association, the list of offers 230 could be updated to include offers from carwashes, offers from an autoparts store, offers from an auto mechanics, etc. The attributes may be stored in the database 115.

Although not illustrated, the list of offers 230 could have included an offer from a nearby subway station, and had the customer selected this offer, the server 110 could have inferred that the customer takes public transportation. Then attributes associated with individuals that take public transportation can be associated with the customer for updating the list of offers 230.

Figure 4:
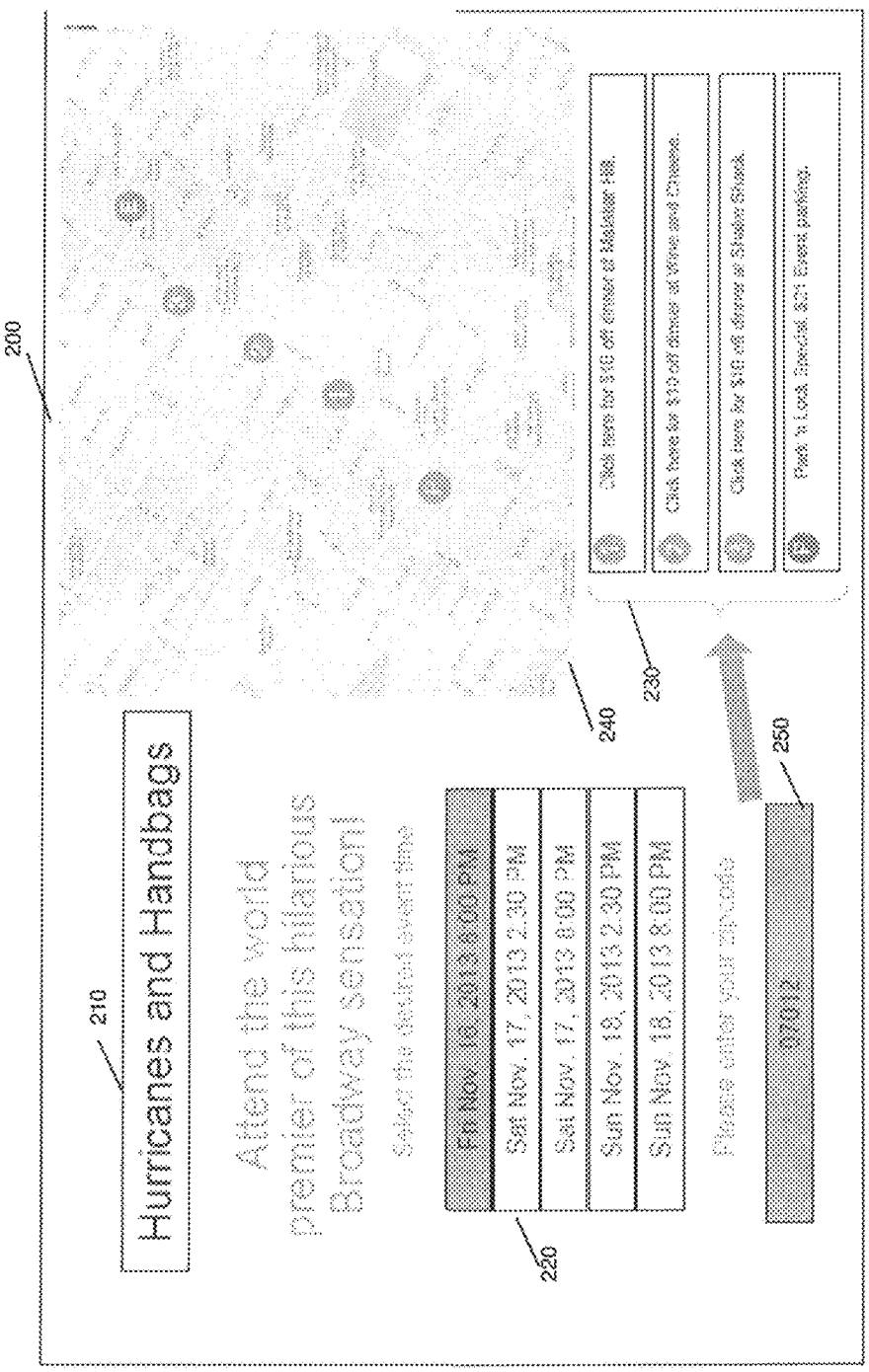
FIG. 4 illustrates an interface that may be presented by the system.

FIG. 4 shows another example of the webpage 200. In this example, the server 110 has updated the list of offers 230 based on a travel path of the customer predicted using information entered by the customer into the information field 250. In this example, the customer has entered a particular zipcode, and based on the address of the event, the server 110 has concluded that a customer from that zipcode is most likely to take the Lincoln Tunnel on his way to the event. The server 110 can determine the one parking garage among multiple parking garages that is most convenient to a customer traveling along the predicted travel path, and update the list of offers 230 to include an offer from the one parking garage, and offers from other merchants along the likely route between the one parking garage and the event. The server 110 can then update the map 140 to reflect the updated list of offers 230.

Figure 5:
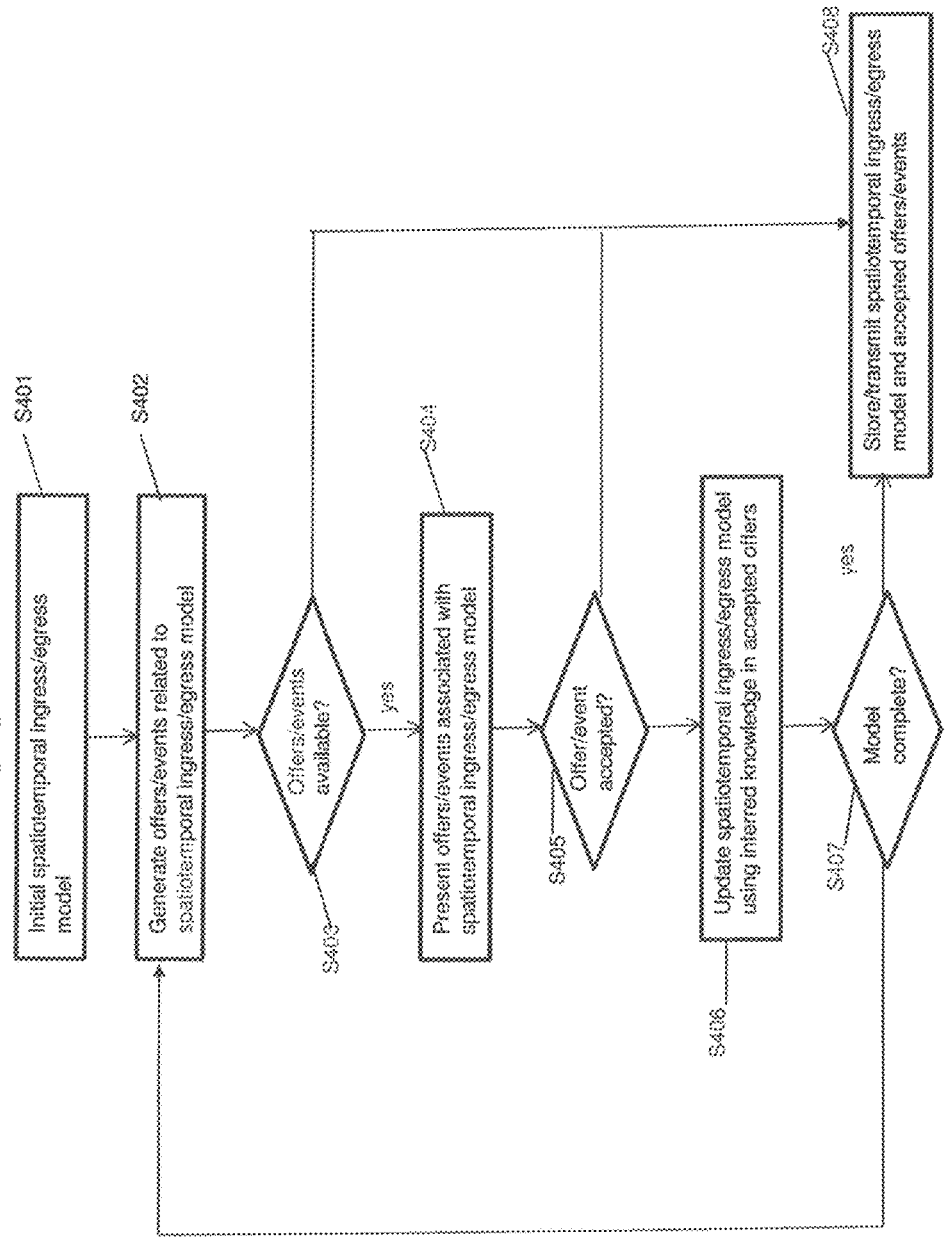
FIG. 5 illustrates a method of performing spatiotemporal events marketing according to an exemplary embodiment of the invention.

FIG. 5 illustrates a method of operating the server 110 according to an exemplary embodiment of the invention. Referring to FIG. 5, the method centers on the iterative improvement of a spatiotemporal ingress/egress model for an individual user. It should be understood that the model can be extended to groups or categories of users as well. The model includes information about the interest level of the user in a particular spatiotemporal event such as a show or sporting event, as well as particular intentions or plans for attending the event (including the path and time of travel), as well as associated data for enabling the attendance such as tickets, restaurant reservations, parking reservations, etc. The model can contain imperative knowledge such as a particular ticket or reservation (I WILL attend the orchestra Saturday night at 8 PM) and/or implied knowledge that measures approximations of interest and affinity (I MAY attend the orchestra Saturday night and am simply interested). The initial spatiotemporal ingress/egress model S401 can be started with a small amount of knowledge, for example, that the user has simply visited a web site related to an event. The initial model may be completely empty as well.

Thereafter, the method of FIG. 5 successively improves the model. Each step of the improvement process starts with a generation S402 of offers or events that might be related to the current model. For example, given an initial model in which the user has been determined to be generally interested in an event, e.g., by visiting the web page for the event—the generation step S402 may include determining the times/dates a selected event is being held and which seats/slots/tickets are available according to a reservation system. If such event times are available S403 where interest by a customer in a particular event among several available events has been established, a list of the different times and dates the event is being held can be presented S404 in an interface on a display of the customer device 120. The method may present a map (e.g., 140) of the area surrounding the event along with the times/dates the event is being held.

The method further includes: determining whether one of the available times/dates has been accepted or selected by the customer S405. This determination can be made using data returned in a software routine that is triggered when the user physically selects an item in list of offers provided in a graphical user interface. For example, when the times/dates are presented in a selectable list, a callback function of the list is called whenever a single item (e.g., a given one of the times/dates) in the list is selected. A parameter associated with the item that uniquely identifies the item (e.g., the selected time/date) from the other items (e.g., the non-selected times/dates) is passed to the function so it can determine what time/date was selected.

In an alternate embodiment the method could treat a user moving his cursor over one of the times/dates in the list as an acceptance or selection of the corresponding time/date. If it is determined that one of the times/dates has been accepted or selected, the model is updated S406 with knowledge that the user intends to attend the event. The method then proceeds back to the refinement step S402 in which additional potential refinements are computed. For example, upon revisiting the refinement step after an event time/place has been selected (and perhaps tickets have been issued) the method can generate S402 a list of offers (e.g., 230) associated with the selected time/date and the event, and if offers are available S403 can display the offers, e.g., by updating the map to identify the locations providing the offers in the list of offers. The method can further include determining whether one of the offers is accepted S405, and if so, updating the model S406 with knowledge inferred from the associated event or offer which will be attended. For example, if the user has selected a parking garage offer, or even simply entered their location information (e.g., home zipcode, a city, a street address, etc.), it can be determined that user will likely travel a certain path to the original event, allowing for the model and subsequent offers to be refined and more closely targeted, and accordingly subsequent lists of offers are updated based on the entered or selected information.

The offers presented in the list of offers 230 are based on advanced knowledge of customer time and place intentions. As the server 110 gains knowledge that the customer intends to be at a given event at a given date/time, offers can be tailored accordingly. These time/place intentions can be refined to a great level of detail based on data provided by the customer and their interactions with the offers. For example, as discussed above, selection of one of the offers enables the server 110 to infer additional information about the customer, which can be used to further refine the list of offers. This process can be repeated several times. For example, each time the list of offers 230 is updated, the customer can select another offer in the list, where information associated with the next selected offer can be used to further refine the list of offers.

The time and place intention of a given customer may be referred to as time/place intention datum and is part of the growing spatiotemporal ingress/egress model for the customer. For example, a first time/place intention datum for a Knicks game at a particular location and date/time may be derived from a first customer searching for basketball tickets on the date/time and a second time/place intention datum for the same Knicks game may be derived from a second customer searching for train tickets with an arrival date/time close to the date/time of the game and at an arrival destination near the game. The server 110 can associate a score with each time/place datum that is indicative of how likely that datum is at predicting that the corresponding customer will be at the event. For example, assume each of the above-described first and second datum receives the same score initially. Then, assume that the first customer who had searched for basketball tickets, uses his customer device 120 (e.g., a smartphone) to check-in (e.g., through FOURSQUARE, FACEBOOK) to a location near the event, but a few hours before the start of the event. Now since more information is available for the first customer, the score associated with his time/place datum of the event can be increased higher. Revisions to the scoring of the time/place datum associated with each customer can be performed continuously as new data is obtained until the scores reach a certain level of confidence. Statistics on time/place data with scores having a high degree of confidence may be valuable to certain parties. Thus, the server 110 may be configured to provide these statistics to subscribers for a fee. Further, a portion of this fee could be shared with the customer for agreeing to make this information accessible to the subscribers.

Referring back to FIG. 1, the database 115 can maintain a list of the available events, including event time and place, and any additional descriptive attributes associated with the event. The database 115 may also maintain a list of affiliated merchants and offers the merchants wishes to extend to attendees of the listed events. The database 115 may also maintain a set of ingress and egress paths, which may be used by attendees to enter and leave the listed events.

The server 110 may be configured to create one or more attendance records, which associate a user as a potential or confirmed attendee of one or more of the listed events. For example, the server 110 can use check-in data provided by the customer device 120 to determine whether the user has attended one of the listed events.

The server 110 is configured to generate zero or more intended path records, which comprise an origin point and a time, and a destination point and time, and descriptive attributes. For example, when it is determined that a user of the customer device 120 is likely to be attending a particular event, an intended path record can be created for each possible path between anorigin location of the user and a destination location of the event. The origin time in the record may be the time at which the user is beyond a certain distance from the origin location. The destination time in the record may be the predicted arrival time based on the origin time, the path taken, and traffic along the path.

The server 110 may be configured to record each proposal of and subsequent acceptance, ignorance or rejection of one or more of the listed merchant offers with one or more of the intended path records. The customer identity may be implied from the intended path record. For example, if a given offer is ignored or rejected at a high rate, the offer can be eliminated from the presented offers or this information can be provided to the merchant (e.g., to the vendor device 130). This provides the merchant with feedback, which can be used by the merchant to revise their offer (e.g., increase the size of the discount). The server 110 can also automatically modify the discount level of those offers that are ignored or rejected at a high rate (e.g., higher than a threshold amount). For example, the server 110 can increase the discount level of the offers rejected at a high rate. In general, the rates of acceptance or rejection of offers can be provided as feedback to the merchant (e.g., output to the corresponding vendor device 130).

The affiliate offers may be events themselves that are logically related to the base event.

In an exemplary embodiment, the event displayed in the webpages 200 shown in FIGS. 2-4 is an event imported from a calendar program of the customer device 120.

In an exemplary embodiment, machine learning is employed by the server 110 to tune the accuracy of the ingress and egress paths based on inferences.

Figure 6:
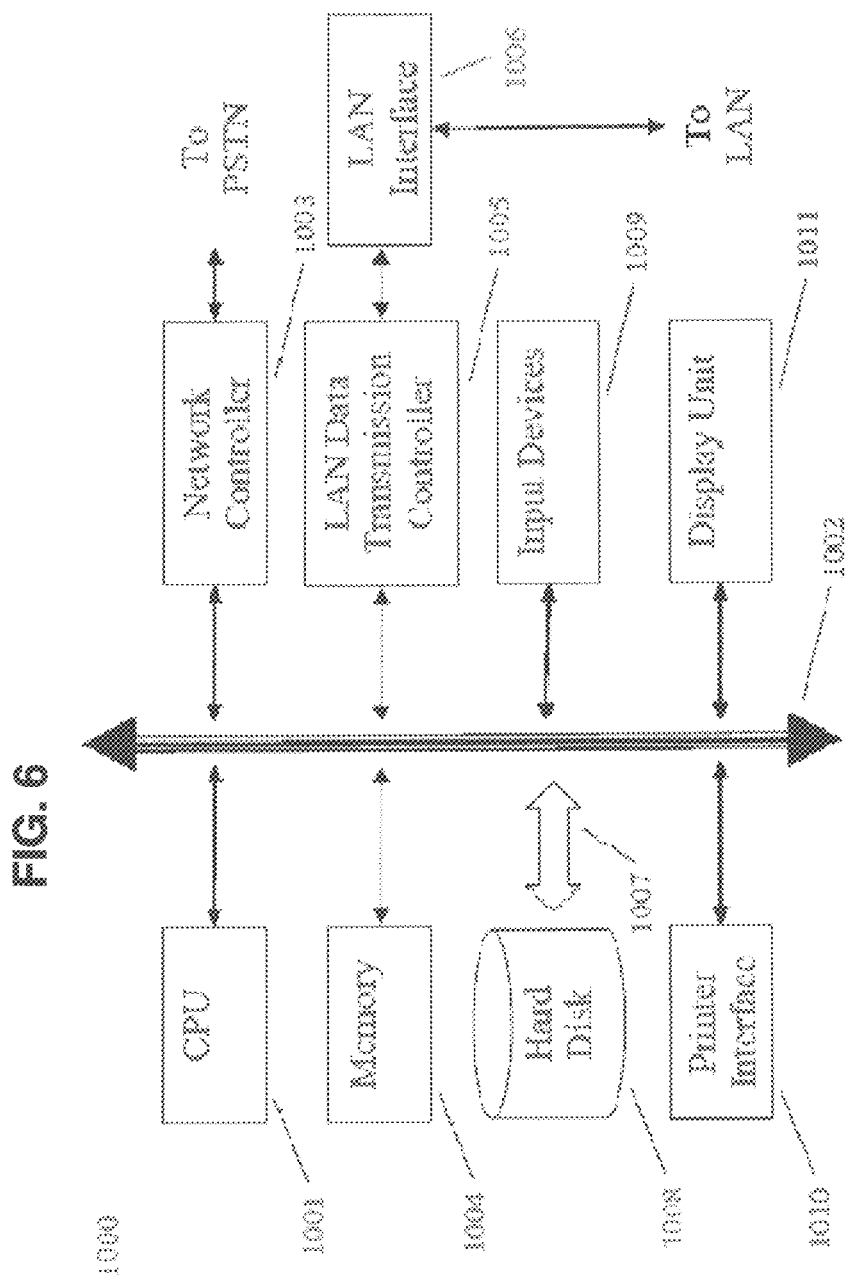
FIG. 6 illustrates an example of a computer system capable of implementing methods and systems according to embodiments of the disclosure.

FIG. 6 illustrates an example of a computer system, which may be used to implement any one of the devices or servers shown in FIG. 1, maintain the webpages 200 illustrated in FIGS. 2-4, or execute any of the above-described methods, according to exemplary embodiments of the invention. For example, the method of FIG. 5 may be implemented in the form of a software application running on the computer system. Further, portions of the methods may be executed on one such computer system, while the other portions are executed on one or more other such computer systems. Examples of the computer system include but are not limited to a mainframe, personal computer (PC), a handheld computer, and a server. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

Referring to FIGS. 1-5, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer system configured to provide spatiotemporal events marketing, the system comprising:
  a memory storing a computer program;
  a database maintaining a list of events including event time and location, a list of affiliated merchants and offers the merchants wish to extend to attendees of the listed events, and
  a processor configured to execute the computer program, wherein the computer program is configured to maintain a first webpage comprising a search field that enables a user of a customer device to enter at least one search term, and determine which one of the listed events the user of the customer device remote from the computer system has an interest in attending based on the entered at least one search term,
  wherein when the computer program determines the user has the interest, the computer program presents an interface on a display of the customer device comprising a second webpage including a selectable list of times in which the one listed event is to occur, and upon the user selecting one of the times, the computer program determines a route from a first location associated with the user to a second location of the determined one listed event or a route from the second location to the first location, and presents the offers of the merchants in the second webpage for the determined one listed event to the customer device based on the selected time, the second location of the determined one listed event, the route, and a spatiotemporal model fix the user, and wherein the computer program updates the spatiotemporal model with information inferred from the determined one listed event and one of the offers selected by the user, wherein the second webpage further includes a map of an area surrounding the determined one listed event and a field for entering the first location, each offer is displayed with one of a plurality of unique symbols, and the symbols are displayed on the map at corresponding locations of the offers.

2. The computer system of claim 1, wherein the offers presented are only from the merchants within a certain distance of the second location that are available within a certain period about the event time.

3. The computer system of claim 1, wherein the database maintains ingress and egress paths usable by the attendees to enter and leave the listed events, and the output offers are only from the merchants on the paths of the determined one listed event.

4. The computer system of claim 1, wherein the computer program is configured to determine whether one of the presented offers has been selected by the user of the customer device, infer a third location from the selected offer, predict a path between the third location and the second location, and present a new list of offers to the customer device only from the offers in some proximity to the predicted path.

5. The computer system of claim 1, wherein the computer program determines the customer has an interest in the one listed event after the user confirms an intention to participate in the determined one listed event.

6. The computer system of claim 1, wherein the computer program is configured to receive a customer location from the customer device, the computer program is configured to predict a path between the customer location and the second location, and present a new list of offers to the customer device only from the offers in some proximity to the predicted path.

7. The computer system of claim 1, wherein. the spatiotemporal model includes associated data for enabling attendance of the determined one listed event.

8. The computer system of claim 1, wherein the spatiotemporal model is empty prior to the update.

9. The computer system of claim 1, wherein the computer program removes one of the presented offers not selected by the user and which has been rejected by other users at a high rate.

10. The computer system of claim 1, wherein the second webpage of the interface includes an input element editable by the user, and the computer program is configured to infer the first location from data entered into the input element.

11. A computer program product to perform spatiotemporal events marketing, the computer program product comprising a computer readable storage medium having program instructions embodied therewith, the program instructions executable by a computer to perform a method comprising:

presenting, by a server, a first webpage comprising a search field that enables a user of a customer device to enter at least one search term;

determining, by the server, which one of a plurality of listed events the user has an interest in attending based on the entered at least one search term;

presenting, by the server, an interface on a display of the customer device when the server determines the user has the interest, wherein the interface comprises a second webpage including a selectable list of times in which the determined one listed event is to occur;

determining, by the server, a route from a first location associated with a user of the customer device to a second location of the event or a route from the second location of the event to the first location, upon the user selecting one of the times;

presenting, by the server, a selectable list of offers for the determined one listed event in the second webpage of the interface, wherein the list of offers is based on the selected time, the second location of the determined one listed event, the route, and a spatiotemporal model for the user; and updating the spatiotemporal model with information inferred from the determined one listed event and one of the offers selected by the user, wherein the second webpage further includes a map of an area surrounding the determined one listed event and a field for entering the location, each after is displayed with one of a plurality of unique symbols, and the symbols are displayed on the map at corresponding locations of the offers.

12. The computer program product of claim 11, wherein the list of offers are from merchants within a certain distance of the event that are available within a certain period about the selected time.

13. The computer program product of claim 11, the method further comprising:

determining, by the server, whether one of the offers in the interface has been selected:

inferring a third location from the selected offer;

predicting a path of the user between the third location and the second location of the event; and updating the list of offers to include only offers from merchants in some proximity to the predicted path.

14. The computer program product of claim 11, wherein the second webpage of the interface includes an input element editable by the user, and the method further comprises:

inferring the first location from data entered into the input element;

predicting a path of the user between the third location and the second location of the event; and updating the list of offers to include only offers from merchants in some proximity to the predicted path.

15. The computer program product of claim 11, wherein the spatiotemporal model includes associated data for enabling attendance of the determined one listed event.

16. The computer program product of claim 11, wherein the spatiotemporal model is empty prior to the update.

17. The computer program product of claim 11, wherein the computer program removes one of the presented oilers not selected by the user and which has been rejected by other users at a high rate.

* * * * *